United States Patent
Lee et al.

(10) Patent No.: US 8,194,768 B1
(45) Date of Patent: Jun. 5, 2012

(54) CHANNEL ESTIMATION USING LINEAR PHASE ESTIMATION

(75) Inventors: Jungwon Lee, Cupertino, CA (US); Raj M. Misra, Pleasanton, CA (US); Adina Matache, Mountain View, CA (US); Konstantinos Sarrigeorgidis, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 907 days.

(21) Appl. No.: 12/195,158

(22) Filed: Aug. 20, 2008

Related U.S. Application Data (60) Provisional application No. 60/965,436, filed on Aug. 20, 2007.

(51) Int. Cl.
*H04K 1/10* (2006.01)

(52) U.S. Cl. ........ 375/261; 375/267; 375/346; 375/349; 708/6; 708/422; 708/822

(58) Field of Classification Search .................. 375/260, 375/346, 267, 349; 708/6, 442, 822
See application file for complete search history.

(56) References Cited

U.S. PATENT DOCUMENTS

| | | | |
|---|---|---|---|
| 6,618,352 B1 * | 9/2003 | Shirakata et al. | 370/203 |
| 2006/0140303 A1 * | 6/2006 | Egashira et al. | 375/299 |
| 2009/0003479 A1 * | 1/2009 | Kim et al. | 375/260 |

* cited by examiner

*Primary Examiner* — Eva Puente
*Assistant Examiner* — Rahel Guarino (57) ABSTRACT

Systems and methods are provided for channel estimation using linear phase estimation. These systems and methods enable improved channel estimation by estimating a linear channel phase between received pilot subcarrier signals. The estimated linear phase can then be removed from the received pilot subcarrier signals. After the estimated linear phase is removed from the received pilot subcarrier signals, a channel response can be estimated. A final estimated channel response can be generated by multiplying the results of the linear channel estimation by the estimated linear phase.

30 Claims, 11 Drawing Sheets

| Number of FFT points, Zone | Number of distinct distances $M$ | The $M$ different distances between pilots for even numbered symbol and corresponding size $\{q_m, size(I_m)\}$ | The $M$ different distances between pilots for odd numbered symbol and corresponding size $\{q_m, size(I_m)\}$ | Number of pilots except the highest frequency pilot $\tilde{P}$ |
|---|---|---|---|---|
| 1024, PUSC | 1 (restrict LP calculation to within cluster) | $q_1 = 4, size(I_1) = 60$ | $q_1 = 12, size(I_1) = 60$ | 119 |
| 1024, PUSC | 3 (allow across cluster LP calculation) | $q_1 = 4, size(I_1) = 60$<br>$q_2 = 10, size(I_2) = 59$<br>$q_3 = 11, size(I_3) = 1$ | $q_1 = 12, size(I_1) = 60$<br>$q_2 = 2, size(I_2) = 59$<br>$q_3 = 3, size(I_3) = 1$ | 119 |
| 1024, FUSC | 1 (only variable pilot set) | $q_1 = 12, size(I_1) = 70$ | $q_1 = 12, size(I_1) = 70$ | 70 |

CHANNEL ESTIMATION USING LINEAR PHASE ESTIMATION

CROSS-REFERENCE TO RELATED APPLICATIONS

This claims the benefit under 35 U.S.C. §119(e) of U.S. Provisional Application No. 60/965,436 filed Aug. 20, 2007, which is hereby incorporated herein by reference in its entirety.

BACKGROUND

The following relates generally to transmitting information between a source and a receiver in a wireless communication system, and more particularly to designs for channel estimation using linear phase estimation.

Orthogonal frequency-division multiplexing (OFDM) is a digital multi-carrier modulation scheme which uses a large number of closely-spaced subcarriers made up of an orthogonal set of data symbols to transmit information. These subcarriers typically overlap in frequency, but may be separated at receivers using algorithms such as a Fast Fourier Transform. Each subcarrier is typically modulated with a conventional modulation scheme, such as quadrature amplitude modulation or amplitude phase and shift keying, in order to maintain a data rate similar to a single-carrier modulation scheme. In orthogonal frequency division multiple access (OFDMA) systems multiple users are allocated different groups of OFDM subcarriers, which are sometime referred to herein as subchannels or channels. The reuse of subcarriers between neighboring cells as well as the spacing between subcarriers from all of the cells results in co-channel interference.

Typical techniques to estimate the channel response between the source and the receiver in OFDM systems use a pilot signal sent by source to a receiver. Conventionally, channel estimation techniques use complex linear operations such as maximum likelihood (ML) channel estimation, minimum mean squared error (MMSE) channel estimation, and weighted average channel estimation. Each of these approaches have high complexity and may require prior knowledge of channel statistics.

SUMMARY

Accordingly, systems and methods are disclosed for channel estimation using linear phase estimation. These systems and methods enable improved channel estimation by estimating a linear channel phase between received pilot subcarrier signals. The linear phase here refers to a phase that changes linearly with frequency. The estimated linear phase can then be removed from the received pilot subcarrier signals. After the estimated linear phase is removed from the received pilot subcarrier signals, a channel response can be estimated by utilizing any of the conventional channel estimation techniques. However, the linear phase removal allows the usage of linear interpolation, a simple channel estimation technique, thereby reducing the complexity of the overall receiver. A final estimated channel response can be generated by multiplying the results of the linear channel estimation by the estimated linear phase.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
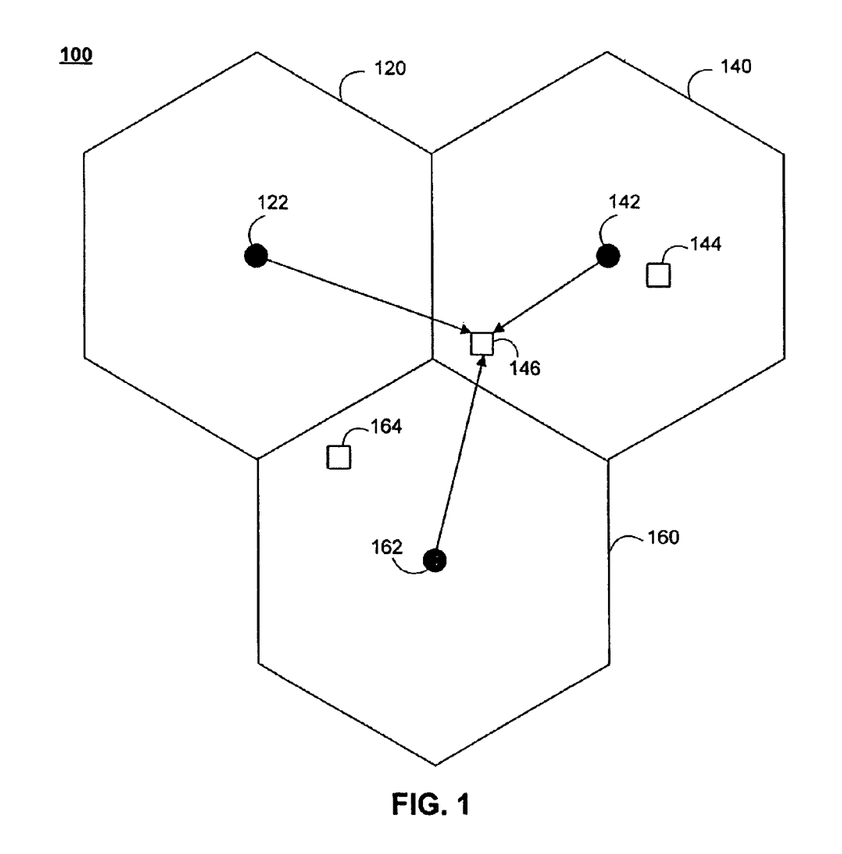
FIG. 1 is a diagram of three radio cells of an illustrative cellular system.

FIG. 1 shows a simplified diagram of illustrative orthogonal frequency-division multiplexing (OFDM) cellular system 100. Cellular system 100 can include a plurality of base stations that are interconnected to form a mobile or cellular network. These base stations can include base stations 122, 142, and 162. Each of these base stations can be configured to communicate with mobile stations located within a particular physical area within that base station's radio communications range. The physical area may be referred to as a radio cell. In particular, base station 122 may communicate with mobile stations within radio cell 120, base station 142 may communicate with mobile stations within radio cell 140 (e.g., mobile stations 144 and 146), and base station 162 may communicate with mobile stations within radio cell 160 (e.g., mobile station 164). In FIG. 1, radio cells 120, 140, and 160 are represented by hexagonal regions, although this shape is merely illustrative.

While some embodiments of the present invention are described in terms of an OFDM system, such as cellular system 100, this is merely illustrative. The techniques, features, and functionalities of the embodiments may be applied to other suitable OFDM systems, such as WiMAX, WiFi, 3GPP Long Term Evolution (LTE), Digital Video Broadcasting (DVB), Digital Audio Broadcasting (DAB), and other communication systems.

Mobile stations 144, 146, and 164 may be any suitable type of cellular telephone compatible with the base stations of the mobile network. For example, mobile stations 144, 146, and 164 can operate based on a protocol or communications standard compatible with base stations 122, 142, and 162. The base stations and mobile stations of cellular system 100 can operate using any suitable conventional cellular protocol, such as the Global Systems for Mobile communications ("GSM") standard a code division multiple access ("CDMA") based standard, an orthogonal frequency-division multiple access ("OFDMA") based standard (such as WiMAX), or using a non-conventional protocol.

The base stations and mobile stations in cellular system 100 may use any of a variety of modulation and coding schemes to enable reliable communication. For example, base stations 122, 142, and 162 may operate with a modulation scheme based on orthogonal frequency division multiplexing (OFDM). OFDM is a frequency-division multiplexing (FDM) scheme in which a number of subcarriers are used to carry data. Each subcarrier be transmitted on a distinct time and frequency band or the subcarriers may be transmitted on overlapping time and frequency bands. Each subcarrier can also be modulated with a conventional modulation scheme such as quadrature amplitude modulation (QAM) or phase shift keying (PSK). Multiple subcarriers can be grouped together to form channels or subchannels. Orthogonal frequency-division multiple access (OFDMA) systems are multi-user versions of the OFDM modulation scheme in which subsets of subcarriers (i.e., subchannels) are assigned to individual users. In addition to carrying network data, some of the subcarriers within a particular channel or subchannel may carry pilot signals which can be used to provide information about the modulation and coding used over a particular channel and can be used by a receiver to measure conditions of the channel.

To notify the mobile stations of the modulation and coding used by a base station, base stations 122, 142, and 162 may broadcast a control sequence to at least the mobile stations within their respective radio cells. This control sequence may be in the form of a pilot signal. In addition to coding and modulation information, the control sequence may also include any other suitable control information that the mobile stations may use to interpret the data sent by a base station. For example, the control sequence may include information on how the data frames are structured, how many symbols are included in each frame, and the intended recipient (e.g., mobile station) of the next data block.

Base stations 122, 142, and 162 may also transmit a pilot signal to each mobile station within its radio cell to provide each mobile station with, among other things, phase alignment information. The pilot signal may be based on a particular pseudo-noise ("PN") sequence, and each base station may utilize a different PN sequence. The different PN sequences may allow the mobile stations (e.g., mobile station 144) to identify the base station associated with a received pilot signal.

Base stations 122, 142, and 162 may broadcast the pilot signal and network data to all mobile stations that are within radio communication range. This allows each base station to not only transmit information to any mobile station within that base station's radio cell, but also to mobile stations in neighboring radio cells that are sufficiently close to the base station. For example, due to the proximity of mobile station 144 to base station 142 in radio cell 140, mobile station 144 may predominantly receive information from base station 142. Mobile station 146, on the other hand, may be able to receive information not only from base station 142 in radio cell 140, but may also receive interfering information from base station 162 in neighboring radio cell 160. The pilot signal and the network data may be transmitted over separate subcarriers or subchannels of base stations 122, 142, and 162.

If base stations 142 and 162 operate using subcarriers or subchannels such that signals received from these two sources are not easily distinguishable, mobile station 146 may suffer from an effect referred to sometimes as "inter-cell co-channel interference" (or simply "co-channel interference" or "interference"). In addition to co-channel interference, other sources of interference, noise, and other channel imperfections may affect the accuracy with which a receiver can recover a transmitted signal.

Measuring the transmission properties of each subchannel and the interference present on each subchannel can improve the accuracy of the receiver. A subchannels can be measured using a known reference pilot signal that can be sent over one or more subcarriers within a subchannel from a base station to a mobile station or vice versa. Because the receiving station knows what signal was sent, the received reference signal may be analyzed by the receiver to determine the properties of the subchannel on which the signal was transmitted. The reference signal may be the same as the pilot signal discussed above or may be a separate signal. The use of a pilot signal to measure channel properties will be described in greater detail below.

Figure 2:
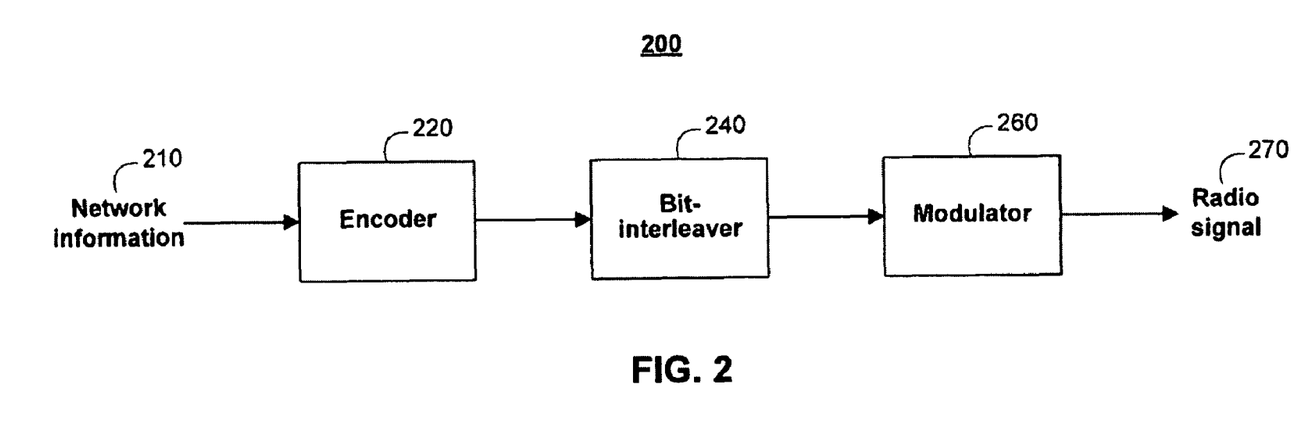
FIG. 2 is a block diagram of an illustrative base station transmitter.

FIG. 2 shows a simplified block diagram of base station transmitter 200 that can prepare network information 210 (including reference signals) for transmission as radio signal 270. In some embodiments, base station transmitter 200 may be implemented as the transmitter for one or more of base stations 122, 142, and 162 of FIG. 1. Base station transmitter 200 can include encoder 220, bit-interleaver 240, and modulator 260.

Encoder 220 may encode network information 210 based on a suitable error correcting code ("ECC"). For example, encoder 220 may operate using a convolutional code (e.g., a rate-½ or rate-⅔ convolutional code) of memory m. Encoder 220 may therefore convert network information 210, which may be some form of digital information (e.g., a stream of binary data), into an encoded stream of binary data. Since encoder 220 may have a memory of m, each m consecutive bits in the encoded stream created by encoder 220 can depend on the value of the same one bit of network information 210. In order to remove any negative effects that may result from this dependency (e.g., the inability to reliably decode when burst errors are present), the encoded stream may be interleaved by bit-interleaver 240. In particular, bit-interleaver 240 may change the order of the bits in the encoded stream to ensure that neighboring bits in the interleaved sequence are effectively independent of each other.

Modulator 260 of base station transmitter 200 may be configured to convert the interleaved digital sequence produced by bit-interleaver 240 into a signal for transmission. Modulator 260 may first group bits of the interleaved sequence into symbols based on the size of a modulation scheme, and may then modulate the symbols into a signal having a particular magnitude and phase specified by the modulation scheme. Modulator 260 may use any suitable modulation scheme of any of a variety of sizes. For example, modulator 260 may utilize a quadrature amplitude modulation ("QAM") scheme (e.g., 4QAM, 16QAM, 32QAM) or a phase shift keying ("PSK") modulation scheme (e.g., QPSK, 16PSK, 32PSK). Then modulator selects the subchannel and associated subcarriers for transmitting the modulated signals.

The particular modulation scheme employed by modulator 260 may be designed to operate effectively with the particular error correcting code (ECC) employed by encoder 200. This type of communications technique is commonly referred to as coded modulation. Therefore, as base station transmitter 200 of FIG. 2 also includes bit-interleaver 240, the overall communications technique employed by base station transmitter 200 can be referred to as bit-interleaved coded modulation ("BICM").

Modulator 260 may produce radio signal 270 for transmission over one or more subchannels to one or more mobile stations (e.g., mobile stations 144, 146, or 164). Radio signal 270 may be subject to noise (e.g., random noise or signal-dependent noise) during data transmission from base station transmitter 200 to a mobile station. In some scenarios, radio signal 270 may be distorted by the channel which may be frequency and time selective. It may be further corrupted due to co-channel interference. Thus, even though radio signal 270 is transmitted, the radio signal actually received by a mobile station receiver may be considerably different from radio signal 270.

Figure 3:
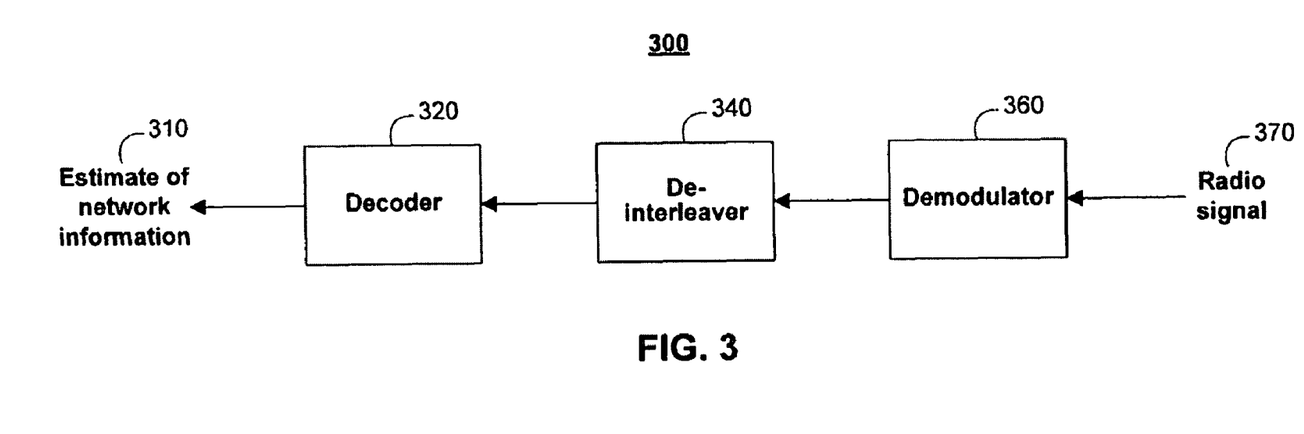
FIG. 3 is a block diagram of an illustrative mobile station receiver.

FIG. 3 shows a simplified block diagram of mobile station receiver 300. In some embodiments, mobile station receiver 300 may be implemented as part of one or more mobile stations 144, 146, and 164. Mobile station receiver 300 can be configured to receive and decode a noisy or distorted version of radio signal 270 (FIG. 2). In particular, mobile station receiver 300 may receive radio signal 370, which may be radio signal 270 after being affected by frequency and time selective distortion (the effect of the channel) and superposition of random or signal-dependent noise and inter-cell co-channel interference. Radio signal 370 may sometimes be represented in the frequency domain by Y[k]. Mathematically, radio signal 370 may be given by, $$Y[k]=H[k]X[k]+Z[k] \text{ for } k=0,1,\ldots,N-1 \quad \text{(EQ. 1)}$$

where k is a subcarrier index, N is the total number of subcarriers, Y[k] is the received signal 370, H[k] is the distortion introduced by the channel or the channel response, X[k] is the transmitted signal 270, and Z[k] is the noise plus co-channel interference.

Mobile station receiver 300 can be configured to decode radio signal 370 and obtain an estimate of the originally transmitted information (e.g., network information 210 of FIG. 2). When radio signal 370 is a received reference pilot signal, whose value is already known, mobile station receiver 300 can be configured to obtain an estimate of the channel gain H[k] which can then be used by mobile station receiver 300 to obtain an estimate of the originally transmitted data. To decode radio signal 370, mobile station receiver 300 can include demodulator 360, de-interleaver 340, and decoder 320. Each of these receiver components may correspond to a transmitter component in base station transmitter 200 and may effectively undo the operation performed by the corresponding transmitter component. For example, demodulator 360 may correspond to modulator 260 that can demodulate/de-map radio signal 370 using at least the modulation scheme and signal constellation set as modulator 260. De-interleaver 340 may correspond to bit-interleaver 240 and may return the order of the received data into its original order, e.g., the order expected by decoder 320. Decoder 320 may be a decoder that corresponds to encoder 220, and may perform decoding based on the same error correcting code (e.g., convolutional code) as encoder 220. Thus, decoder 320 may produce estimate 310 of network information (e.g., network information 210). If mobile station 300 successfully interprets radio signal 370, estimate 310 may be the same digital sequence as network information 210.

Mobile station receiver 300 of FIG. 3 can compute soft information for received signal 370 using estimated channel information for a particular channel. To compute this channel information, mobile station receiver 300 may, for example, include computational logic that estimates channel response information as described in greater detail below with respect to FIG. 4. This computational logic may compute the channel information by analyzing the characteristics of pilot signals received from a source. Mobile station receiver 300 can compute the channel information at any suitable time during operation, such as at power-up, when initially connected to a base station, periodically, whenever a reference signal is received, etc. The improved estimates of the soft information may allow hard-decision decoder 320 to produce more accurate estimates of network information 310.

Channel estimation can be performed using an estimation function $f$ that minimizes the channel estimation error. Thus $\hat{H}$, a vector of channel estimates for all subcarriers N can be written as:

$$\hat{H}=f(Y_P) \quad \text{(EQ. 2)}$$

where $$\hat{H} = \begin{bmatrix} \hat{H}[0] \\ \hat{H}[1] \\ \vdots \\ \hat{H}[N-1] \end{bmatrix}, Y_P = \begin{bmatrix} Y[k_1] \\ Y[k_2] \\ \vdots \\ Y[k_{N_p}] \end{bmatrix}$$

is a vector of received signals from a set of pilot subcarriers, $P=\{k_1, k_2, k_3, \ldots, K_{N_p}\}$ is the set of the pilot subcarriers, and $N_p$ is the number of pilot subcarriers. Equation 2 assumes that the transmit signal X for the pilot subcarriers has a value of 1. However, if this is not the case, Y[k]/X[k] can be used in Equation 2 in place of Y[k].

Conventional estimation functions $f$ for channel estimation have used linear channel estimation to estimate a value for weighted channel matrix W, where $$W = \begin{bmatrix} w_{1,1} & w_{1,2} & \cdots & w_{1,N_p} \\ w_{2,1} & w_{2,2} & \cdots & w_{2,N_p} \\ \vdots & \vdots & \ddots & \vdots \\ w_{N,1} & w_{N,2} & \cdots & w_{N,N_p} \end{bmatrix}.$$

Conventional linear channel estimation approaches include maximum likelihood (ML) channel estimation, minimum mean squared error (MMSE) channel estimation, and weighted average channel estimation. Each of these approaches have high complexity and may require prior knowledge of channel statistics.

Figure 4:
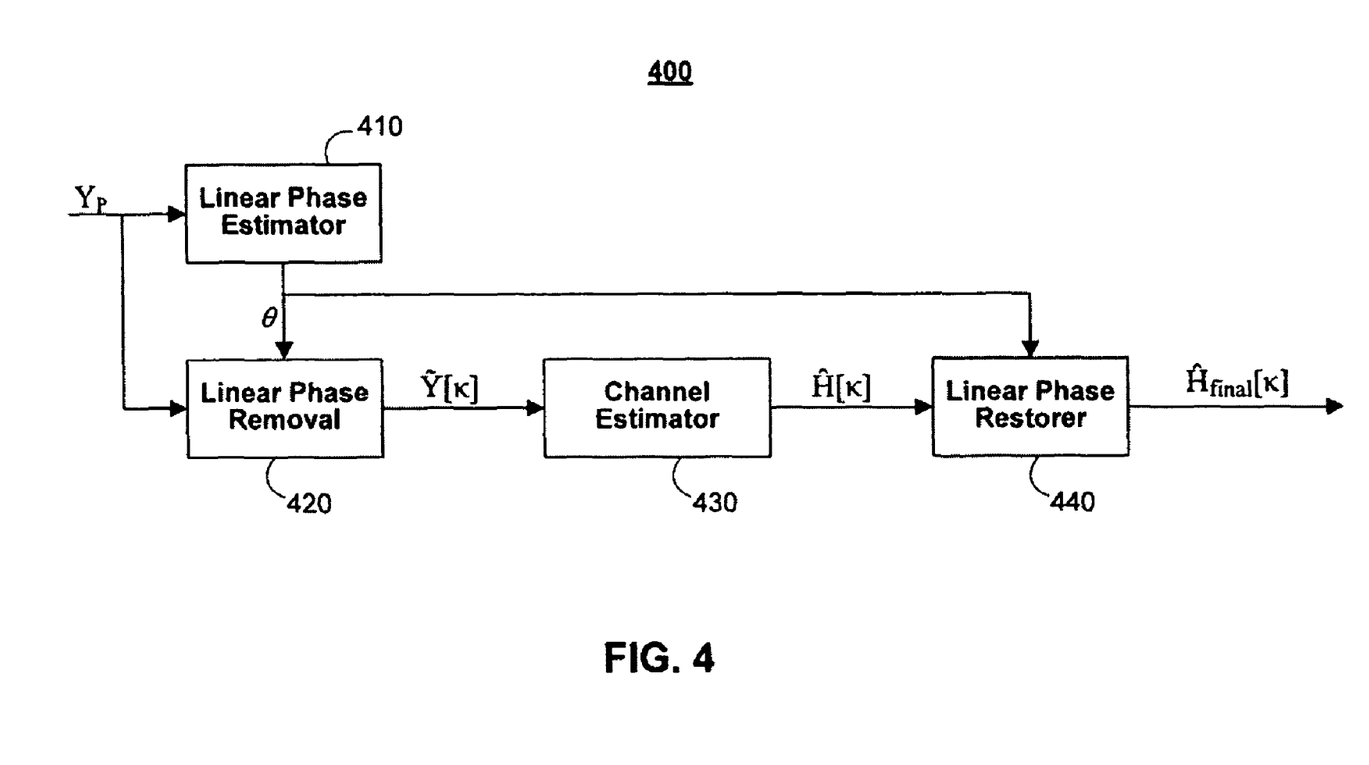
FIG. 4 is a block diagram of illustrative computational logic that can be used to provide channel estimation.

FIG. 4 shows a simplified block diagram of computational logic 400 that can be used for channel estimation based on linear phase estimation. Computational logic 400 can be integrated within mobile station receiver 300 (FIG. 3) and may be implemented within software, hardware, firmware or a combination thereof. Computation logic 400 includes linear phase estimator 410, linear phase removal 420, channel estimator 430, and linear phase restorer 440. The arrangement of computational logic 400 as a series of blocks 410-440 is merely illustrative. Computational logic 400 can be implemented using any suitable number or type of computational blocks used to estimate channel information.

Linear phase estimator 410 can estimate the linear phase (LP) by performing a differential operation on adjacent pilot subcarriers. Where the received pilot subcarriers are spaced at regular intervals, a differential operation for pilot subcarriers can be computed as:

$$D_q[k]=Y^*[k]Y[k+q] \text{ for } k\in\tilde{P} \quad \text{(EQ. 3)}$$

where q is the distance between the regularly spaced adjacent pilot subcarriers and $\tilde{P}$ is the set of pilot subcarriers excluding the highest frequency subcarrier. The sum of all of the signals generated by the differential operation may be computed by:

$$D_{sum} = \sum_{k \in \tilde{P}} D_q[k]. \qquad \text{(EQ. 4)}$$

Then the linear phase estimate θ can be expressed as:

$$\theta = \frac{1}{q} \angle (D_{sum}) \qquad \text{(EQ. 5)}$$

the angle of $D_{sum}$ divided by q.

Where there a multiple intervals between adjacent pilot subcarriers, the differential operation of Equation 3 can by expressed as:

$$D[k_i] = Y^*[k_i] Y[k_{i+1}] \text{ for } k_i \in \tilde{P} \qquad \text{(EQ. 6)}$$

where $D[k_i]$ is partitioned into multiple sets based on the distance of the two constituent pilot subcarriers used for the calculation of $D[k_i]$. Let $I_m$ be the set of indices such that the constituent pilot subcarriers of $D[k_i]$ are separated by $q_m$ and let M be the total number of distinct intervals. Then Equations 4 and 5 can be rewritten for each set of $D[k_i]$ as:

$$D_{sum,m} = \sum_{i \in I_m} D[k_i] \qquad \text{(EQ. 7)}$$

$$\theta_m = \frac{1}{q_m} \angle (D_{sum,m}) \qquad \text{(EQ. 8)}$$

Two approaches can be used to calculate a final linear phase estimate θ from $\theta_m$. In a first approach a weighted average of the linear phases estimates can where calculated from:

$$\theta = \sum_{m=1}^{M} W_m \theta_m \qquad \text{(EQ. 9)}$$

where the weights $W_m$ can be any non-negative number, for example, $$W_m = \frac{|D_{sum,m}|}{\sum_{m=1}^{M} |D_{sum,m}|} \text{ or } W_m = \frac{1}{M}.$$

In the second approach, the weighted average may be computed in the phasor domain as:

$$\theta = \angle \left( \sum_{m=1}^{M} W_m e^{j\theta_m} \right) \qquad \text{(EQ. 10)}$$

where the weights $W_m$ can be, $W_m = |D_{sum,m}|$ for example, or $W_m = 1$.

After calculating a linear phase estimate θ, linear phase removal 420 removes the linear phase from the received pilot subcarrier signal $Y_P$ based on the equation:

$$\tilde{Y}[k] = e^{-jk\theta} Y[k] \qquad \text{(EQ. 11)}.$$

Then channel estimator 430 can be used to calculate the channel estimation based on the linear phase removed received pilot subcarrier signal $\tilde{Y}[k]$. This channel estimation can be performed using any suitable linear or non-linear channel estimation technique. However, as will be explained in more detail below, removing the linear phase from the received pilot subcarrier signal $Y_P$ enables a low complexity linear estimation technique to be used. For example, linear interpolation may be sufficient for the linear estimation. Furthermore, even if a more complex estimation technique is used (e.g., MMSE), the estimation can still be less complex using $\tilde{Y}[k]$.

Finally, the channel estimate $\hat{H}[k]$ for all of the subcarriers generated by channel estimator 430 can be multiplied by the linear phase estimate at linear phase restorer 440 to generate final channel estimate $\hat{H}_{final}[k]$. This can be expressed as:

$$\hat{H}_{final}[k] = e^{jk\theta} \hat{H}[k] \qquad \text{(EQ. 12)}.$$

Computational logic 400 simplifies the channel estimates by pre-processing the received pilot signals to estimate and remove the linear phase, performs a linear channel estimation, and post-processes the channel estimate by restoring the linear phase. Although the pre- and post-processing can add additional steps, these steps reduce the complexity of the channel estimation. In some embodiments, this reduction in complexity allows the use of a less complex linear channel estimation technique.

The frequency selectivity of a channel can effect the linear channel estimation computation complexity. Frequency selectivity is a measure of channel variations over frequency. As frequency selectivity increases, the channel variations increase, and the complexity of linear channel estimation increases. In particular, the number of negligible weights in weighted channel matrix W, described above, decreases as the frequency selectivity increases. Thus, reducing the frequency selectivity of the channel can reduce the number of non-negligible weights. In fact, to reduce the linear channel estimation complexity it may be desirable to have only a few non-negligible weights for each row of weight matrix W. As will be shown, removing the linear phase from the received pilot signals, can reduce the linear channel estimation complexity in this manner.

For a given time-domain channel impulse response, the frequency-domain channel gain can be calculated as:

$$H[k] = \sum_{n=0}^{N-1} h[n] e^{-j\frac{2\pi n k}{N}} \qquad \text{(EQ. 13)}$$

Thus, the frequency-domain channel gain can be represented as a superposition of complex exponential functions, each of which has the frequency of −n/N and a magnitude of h[n]. In order to reduce linear channel estimation complexity, the symbol timing of Equation 13 can be adjusted using linear phase estimation such that the ideal symbol timing for the time-domain impulse response becomes such that h[n]=0 for negative values of n and h[0] is non-zero. For example, for a given delay spread of d samples, the ideal symbol timing has a highest frequency of −(d−1)/N. Thus, channel impulse response h[n]=δ[n]+δ[n−1]+δ[n−2] has a highest frequency of −2/N. With linear phase estimation, the channel impulse response can be almost symmetrical to n=0. After phase removal h[n]=δ[n]+δ[n−1]+δ[n−2] becomes h̃[n]=δ[n−1]+δ[n]+δ[n+1] which has a highest frequency of ±1/N. Therefore, because the highest frequency of the channel impulse response can be reduced by the linear phase removal, the modified channel impulse response is less frequency selective than the original frequency-domain channel gain.

While mobile station receiver 300 (FIG. 3) is shown as receiving a single radio signal, it should be understood that in some embodiments, a mobile station receiver can have multiple receive antennas. In these embodiments, the receiver can perform channel estimation including linear phase estimation separately for each antenna. In some instances channel estimates for a receive antenna can be used to calculate channel estimates for others receive antennas. Furthermore, in single and multiple receive antenna receivers after channel estimation is performed, the channel estimates can be averaged over time to further increase channel estimation accuracy.

Figure 5:
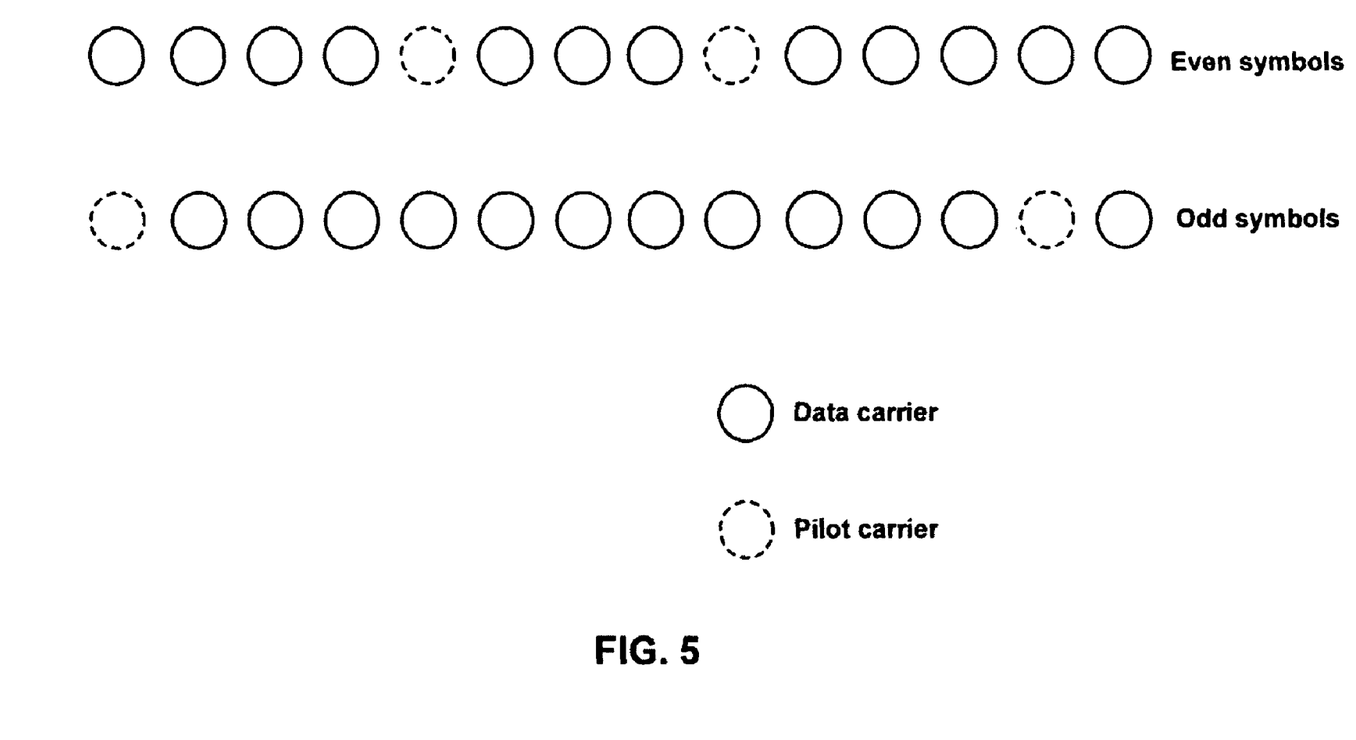
FIG. 5 is a diagram of an illustrative pilot subcarrier pattern for a partial usage of subchannels (PUSC) mode of WiMax with a single transmit antenna.
Figure 6:
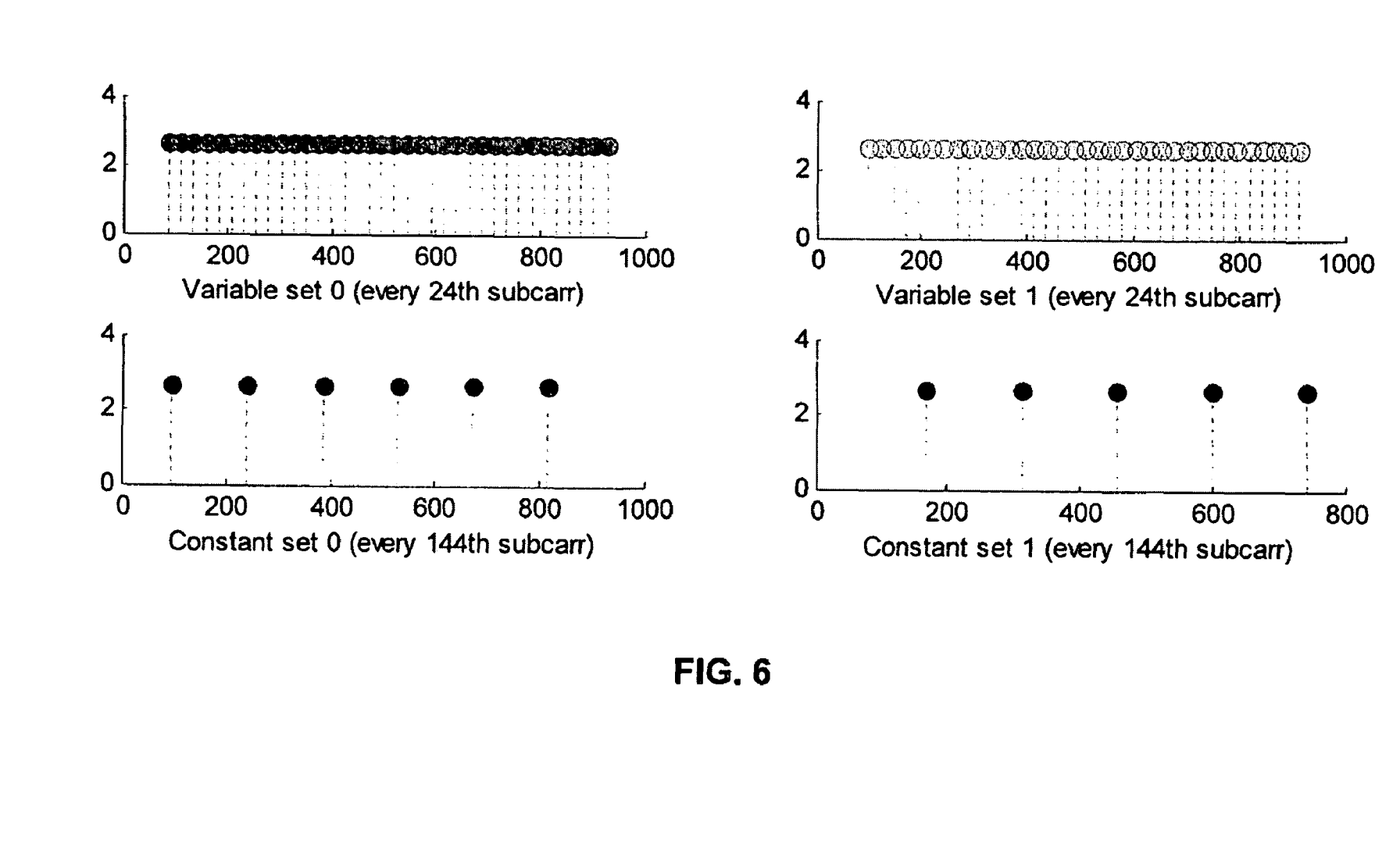
FIG. 6 is a diagram of an illustrative pilot subcarrier pattern for a full usage of subchannels (FUSC) mode of WiMax with a single transmit antenna.
Figure 7:
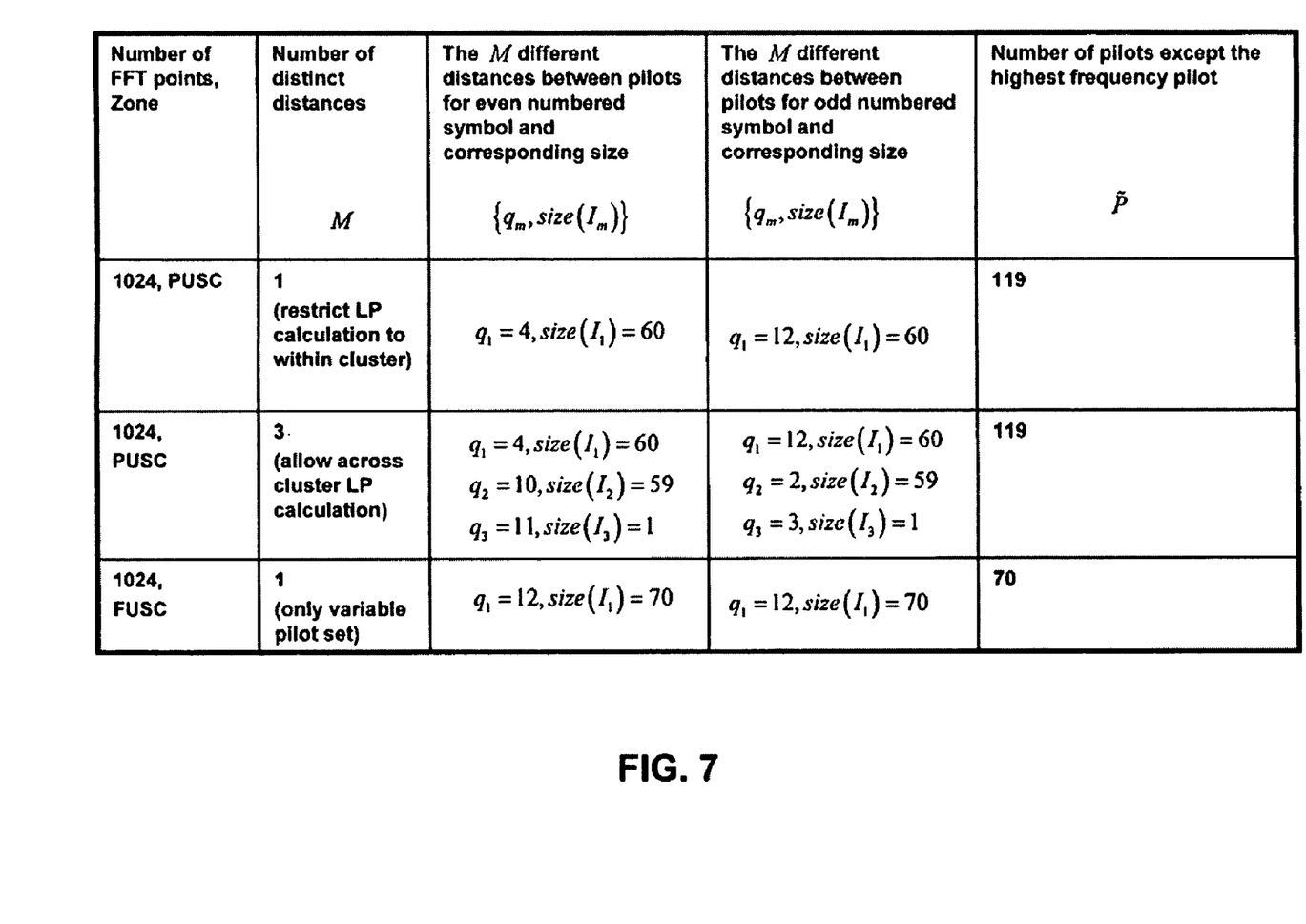
FIG. 7 is a table of exemplary parameters that can be used for linear phase estimations in a few of the many WiMax protocol variations.

FIGS. 5-7 show various WiMax subcarrier allocations in which linear phase estimation can be used for channel estimation. For example, within the WiMax protocol that are several different subcarrier allocations that can depend on bandwidth, the type of OFDM symbol (preamble or regular), and the zone type. For any of these protocols, the overall linear phase estimation procedure remains the same. The differences only affect, for example, the number of pilot subcarriers, the distance between pilot subcarriers, the number of differential phase calculations, etc.

FIG. 5 shows an illustrative pilot subcarrier pattern for a partial usage of subchannels (PUSC) mode of WiMax with a single transmit antenna. In this mode, there are even and odd symbols having different pilot locations. Both symbols include twelve data subcarriers and two pilot subcarriers. The two pilot subcarriers in each symbol form one differential pair.

FIG. 6 shows an illustrative pilot subcarrier pattern for a full usage of subchannels (FUSC) mode of WiMax with a single transmit antenna. In this mode, there are even and odd symbols having different pilot locations. Even symbols include the two variable sets and the two constant sets shown in FIG. 6 and includes 82 pilots subcarriers for each 1024 subcarriers. Only the pilot subcarriers within the variable sets are used for channel estimation. Odd symbols are the same as the even symbols, but are shifted to the right by six subcarriers.

FIG. 7 is a table of exemplary parameters that can be used for linear phase estimations in a few of the many WiMax protocol variations. The table includes information on the number of distinct distances between pilot signals, the different distances between pilots for even and odd numbered symbols and their sizes, and the number of pilots.

Referring now to FIGS. 8A-8E, various exemplary implementations of the present invention are shown.

Figure 8A:
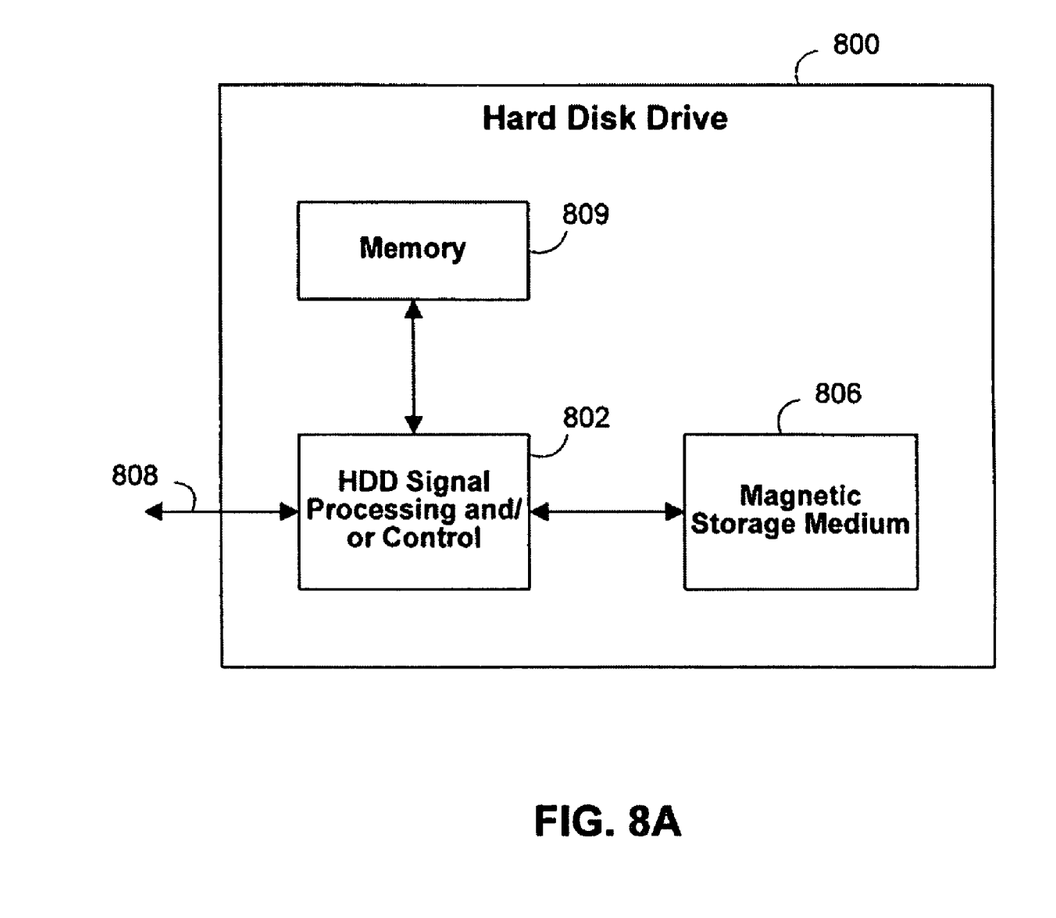
FIG. 8A is a block diagram of an exemplary hard disk drive that can employ the disclosed technology.

Referring now to FIG. 8A, the present invention can be implemented in a hard disk drive (HDD) 800. The present invention may implement either or both signal processing and/or control circuits, which are generally identified in FIG. 8A at 802. In some implementations, the signal processing and/or control circuit 802 and/or other circuits (not shown) in the HDD 800 may process data, perform coding and/or encryption, perform calculations, and/or format data that is output to and/or received from a magnetic storage medium 806.

The HDD 800 may communicate with a host device (not shown) such as a computer, mobile computing devices such as personal digital assistants, cellular phones, media or MP3 players and the like, and/or other devices via one or more wired or wireless communication links 808. The HDD 800 may be connected to memory 809 such as random access memory (RAM), low latency nonvolatile memory such as flash memory, read only memory (ROM) and/or other suitable electronic data storage.

Figure 8B:
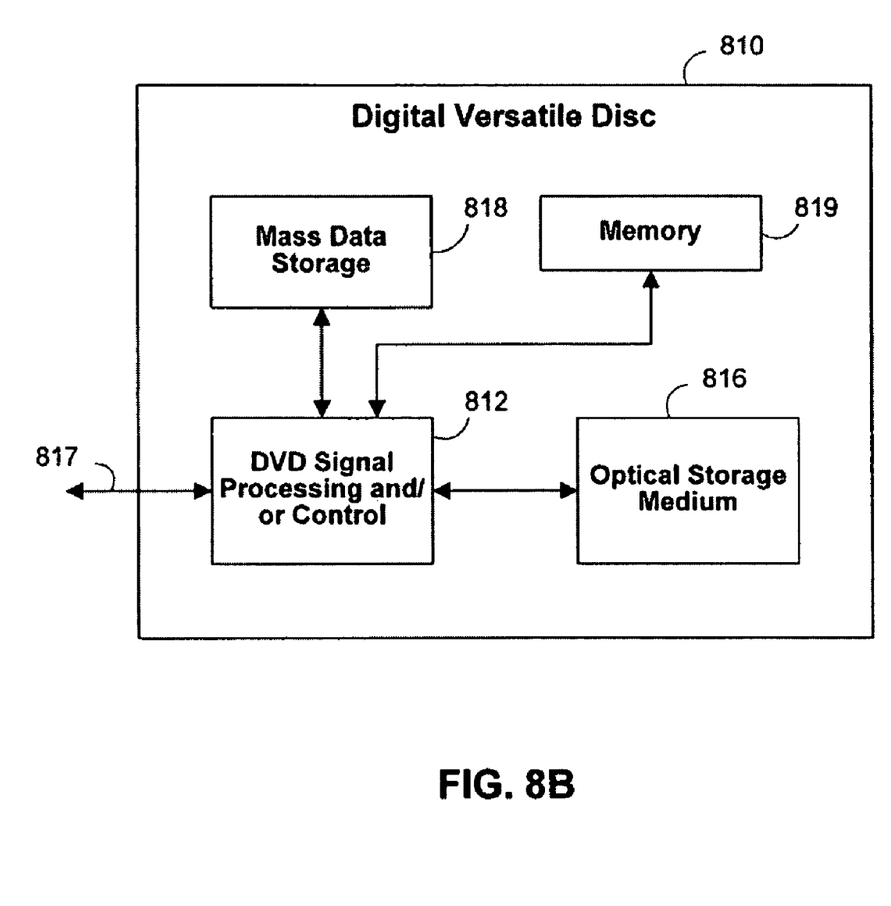
FIG. 8B is a block diagram of an exemplary digital versatile disc that can employ the disclosed technology.

Referring now to FIG. 8B, the present invention can be implemented in a digital versatile disc (DVD) drive 810. The present invention may implement either or both signal processing and/or control circuits, which are generally identified in FIG. 8B at 812, and/or mass data storage of the DVD drive 810. The signal processing and/or control circuit 812 and/or other circuits (not shown) in the DVD drive 810 may process data, perform coding and/or encryption, perform calculations, and/or format data that is read from and/or data written to an optical storage medium 816. In some implementations, the signal processing and/or control circuit 812 and/or other circuits (not shown) in the DVD drive 810 can also perform other functions such as encoding and/or decoding and/or any other signal processing functions associated with a DVD drive.

The DVD drive 810 may communicate with an output device (not shown) such as a computer, television or other device via one or more wired or wireless communication links 817. The DVD drive 810 may communicate with mass data storage 818 that stores data in a nonvolatile manner. The mass data storage 818 may include a hard disk drive (HDD). The HDD may have the configuration shown in FIG. 8A. The HDD may be a mini HDD that includes one or more platters having a diameter that is smaller than approximately 1.8". The DVD drive 810 may be connected to memory 819 such as RAM, ROM, low latency nonvolatile memory such as flash memory and/or other suitable electronic data storage.

Figure 8C:
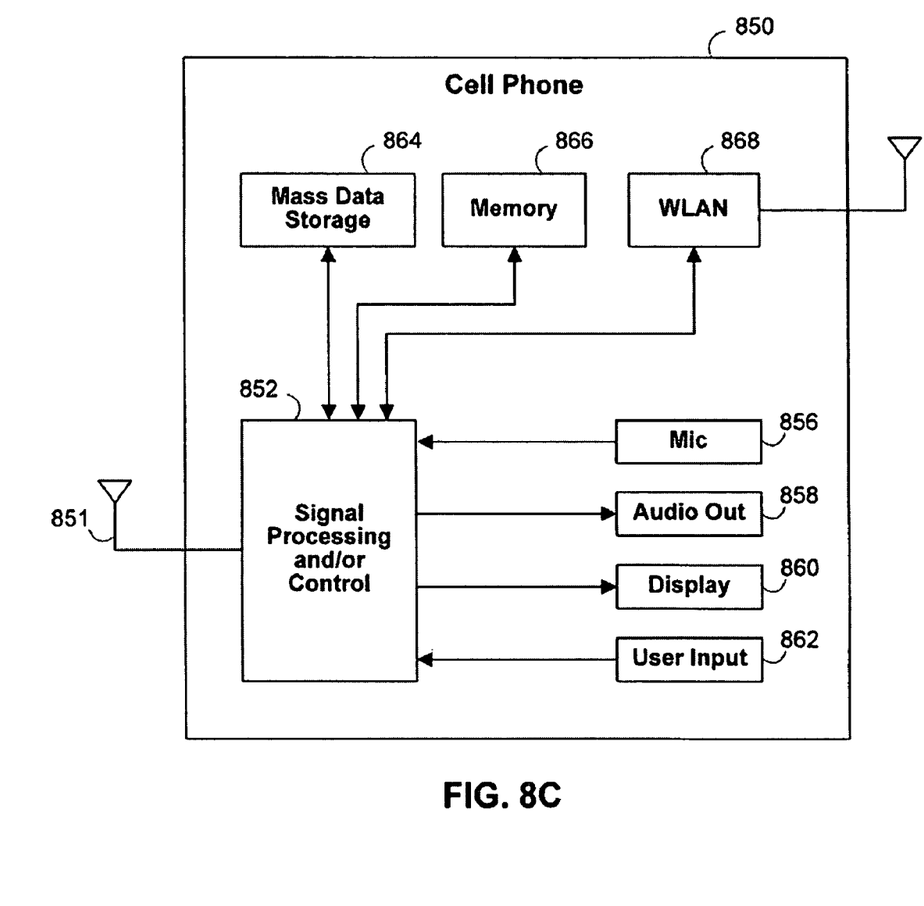
FIG. 8C is a block diagram of an exemplary cell phone that can employ the disclosed technology.

Referring now to FIG. 8C, the present invention can be implemented in a cellular phone 850 that may include a cellular antenna 851. The present invention may implement either or both signal processing and/or control circuits, which are generally identified in FIG. 8C at 852, a WLAN interface and/or mass data storage of the cellular phone 850. In some implementations, the cellular phone 850 includes a microphone 856, an audio output 858 such as a speaker and/or audio output jack, a display 860 and/or an input device 862 such as a keypad, pointing device, voice actuation and/or other input device. The signal processing and/or control circuits 852 and/or other circuits (not shown) in the cellular phone 850 may process data, perform coding and/or encryption, perform calculations, format data and/or perform other cellular phone functions.

The cellular phone 850 may communicate with mass data storage 864 that stores data in a nonvolatile manner such as optical and/or magnetic storage devices, for example, hard disk drives and/or DVD drives. At least one HDD may have the configuration shown in FIG. 8A and/or at least one DVD drive may have the configuration shown in FIG. 8B. The HDD may be a mini HDD that includes one or more platters having a diameter that is smaller than approximately 1.8". The cellular phone 850 may be connected to memory 866 such as RAM, ROM, low latency nonvolatile memory such as flash memory and/or other suitable electronic data storage. The cellular phone 850 also may support connections with a WLAN via a WLAN interface 868.

Figure 8D:
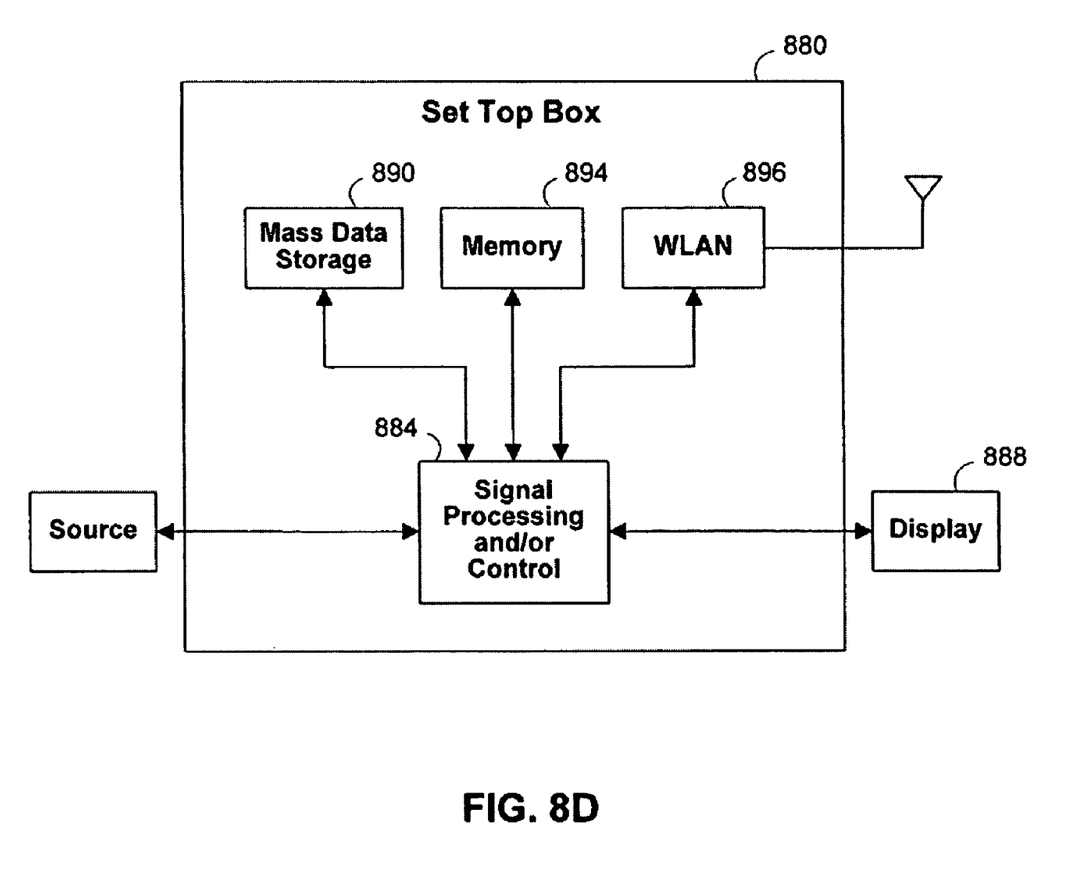
FIG. 8D is a block diagram of an exemplary set top box that can employ the disclosed technology.

Referring now to FIG. 8D, the present invention can be implemented in a set top box 880. The present invention may implement either or both signal processing and/or control circuits, which are generally identified in FIG. 8D at 884, a WLAN interface and/or mass data storage of the set top box 880. The set top box 880 receives signals from a source such as a broadband source and outputs standard and/or high definition audio/video signals suitable for a display 888 such as a television and/or monitor and/or other video and/or audio output devices. The signal processing and/or control circuits 884 and/or other circuits (not shown) of the set top box 880 may process data, perform coding and/or encryption, perform calculations, format data and/or perform any other set top box function.

The set top box 880 may communicate with mass data storage 890 that stores data in a nonvolatile manner. The mass data storage 890 may include optical and/or magnetic storage devices, for example, hard disk drives and/or DVD drives. At least one HDD may have the configuration shown in FIG. 8A and/or at least one DVD drive may have the configuration shown in FIG. 8B. The HDD may be a mini HDD that includes one or more platters having a diameter that is smaller than approximately 1.8". The set top box 880 may be connected to memory 894 such as RAM, ROM, low latency nonvolatile memory such as flash memory and/or other suitable electronic data storage. The set top box 880 also may support connections with a WLAN via a WLAN interface 896.

Figure 8E:
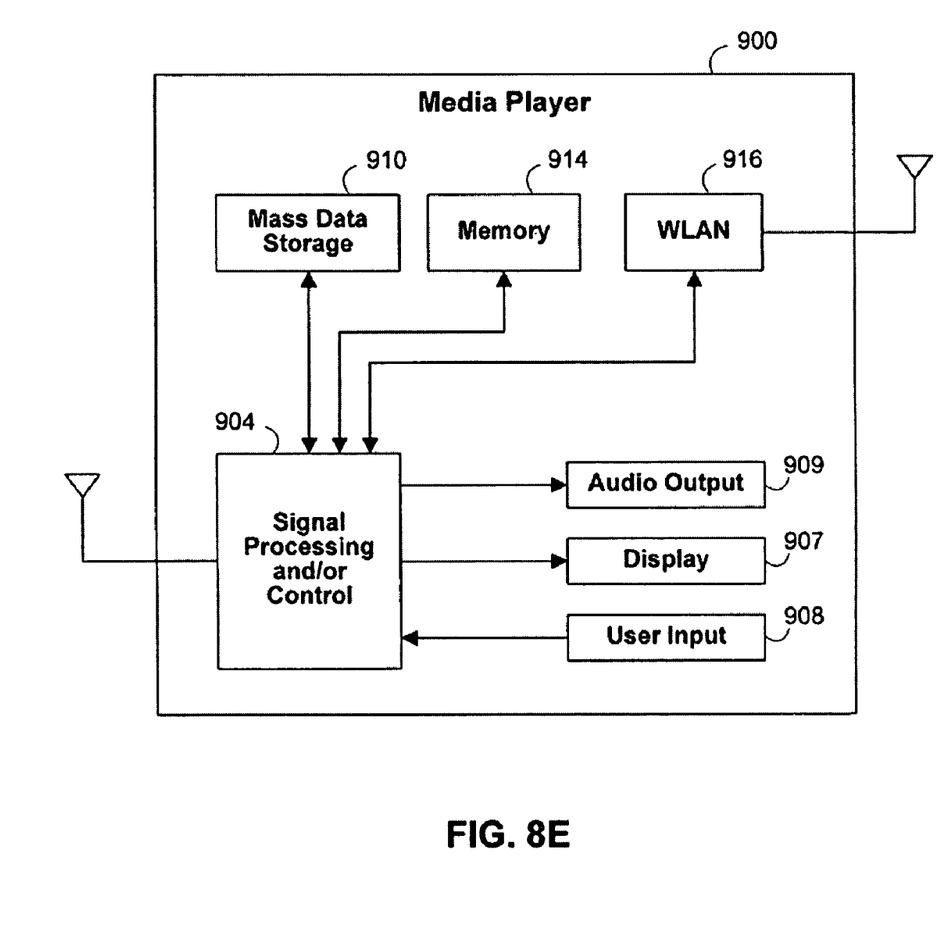
FIG. 8E is a block diagram of an exemplary media player that can employ the disclosed technology.

Referring now to FIG. 8E, the present invention can be implemented in a media player 960. The present invention may implement either or both signal processing and/or control circuits, which are generally identified in FIG. 8E at 904, a WLAN interface and/or mass data storage of the media player 900. In some implementations, the media player 900 includes a display 907 and/or a user input 908 such as a keypad, touchpad and the like. In some implementations, the media player 900 may employ a graphical user interface (GUI) that typically employs menus, drop down menus, icons and/or a point-and-click interface via the display 907 and/or user input 908. The media player 900 further includes an audio output 909 such as a speaker and/or audio output jack. The signal processing and/or control circuits 904 and/or other circuits (not shown) of the media player 900 may process data, perform coding and/or encryption, perform calculations, format data and/or perform any other media player function.

The media player 900 may communicate with mass data storage 910 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices, for example, hard disk drives and/or DVD drives. At least one HDD may have the configuration shown in FIG. 8A and/or at least one DVD drive may have the configuration shown in FIG. 8B. The HDD may be a mini HDD that includes one or more platters having a diameter that is smaller than approximately 1.8". The media player 900 may be connected to memory 914 such as RAM, ROM, low latency nonvolatile memory such as flash memory and/or other suitable electronic data storage. The media player 900 also may support connections with a WLAN via a WLAN interface 916. Still other implementations in addition to those described above are contemplated.

The above described embodiments of the present invention are presented for the purposes of illustration and not of limitation. Since many embodiments of the invention can be made without departing from the spirit and scope of the invention, the invention resides in the claims hereinafter appended. Furthermore, the present invention is not limited to a particular implementation. For example, one or more steps of methods described above may be performed in a different order or concurrently and still achieve desirable results. The invention may be implemented in hardware, such as on an application specific integrated circuit (ASIC) or on a field-programmable gate array (FPGA). The invention may also be implemented in software.

What is claimed is:

1. A method for estimating a channel response, the method comprising:
receiving, using a receiver, a signal that includes a plurality of pilot subcarrier signals;
estimating, using a linear phase estimator, a linear phase between adjacent members of the plurality of pilot subcarrier signals, wherein estimating the linear phase comprises:
performing a differential operation on each of the adjacent members of the plurality of pilot subcarrier signals,
summing signals generated by the differential operation, and
generating the linear phase estimate by measuring an angle of the sum of the signals and dividing the angle by a distance between the adjacent members of the plurality of pilot subcarrier signals; and
estimating, using a channel estimator, a channel response from the pilot subcarrier signals using the estimated linear phase.

2. The method of claim 1, wherein each of the adjacent members of the plurality of pilot subcarrier signals are regularly spaced.

3. The method of claim 2, wherein:
performing the differential operation comprises calculating $D_q[k]$ using $D_q[k]=Y^*[k]Y[k+q]$ for $k \in \tilde{P}$, where q is a distance between the regularly spaced pilot subcarrier signals and $\tilde{P}$ is a set of the p regularly spaced pilot subcarrier signals excluding a highest frequency pilot subcarrier signal;
summing the signals generated by the differential operation comprises calculating $$D_{sum} = \sum_{k \in \tilde{P}} D_q[k];$$

and generating the linear phase comprises calculating $$\theta = \frac{1}{q} \angle (D_{sum}).$$

4. The method of claim 1, wherein each of the adjacent members of the plurality of pilot subcarrier signals are spaced at different distances.

5. The method of claim 4, wherein:
performing the differential operation comprises calculating $D[k_i]$ using $D[k_i]=Y^*[k_i]Y[k_{i+1}]$ for $k_i \in \tilde{P}$, where $D[k_i]$ is partitioned into a plurality of sets based on the different distances, $I_m$ is a set of indices such that the plurality of pilot subcarrier signals within each set $D[k_i]$ are separated by $q_m$, and M is a number of different intervals;
summing the signals generated by the differential operation comprises calculating $$D_{sum,m} = \sum_{i \in I_m} D[k_i];$$

and
generating the linear phase comprises calculating $$\theta_m = \frac{1}{q_m} \angle(D_{sum,m})$$

and calculating a final linear phase estimate θ from $\theta_m$.

6. The method of claim 1, wherein estimating the channel response using the estimated linear phase comprises:
removing the estimated linear phase from the plurality of pilot subcarrier signals to generate a plurality of phase-removed pilot subcarrier signals;
calculating an estimated channel response from the plurality of phase-removed pilot subcarrier signals; and
generating a final estimated channel response by multiplying the estimated channel response by the estimated linear phase.

7. The method of claim 1, wherein the channel response estimation is used in an orthogonal frequency division multiplexing (OFDM) protocol, a WiMax protocol, or a WiFi protocol.

8. The method of claim 1, wherein the signal is received by a first antenna in a multiple antenna system and wherein each antenna in the multiple antenna system receives its own signal and separately estimates a channel response.

9. The method of claim 1, wherein the final estimated channel response can be averaged over time with further final estimated channel responses.

10. The method of claim 1, wherein estimating the channel response comprises linear interpolation.

11. A system for estimating a channel response, the system comprising:
an antenna that receives a signal that includes a plurality of pilot subcarrier signals;
a linear phase estimator that estimates a linear phase between adjacent members of the plurality of pilot subcarrier signals, wherein the linear phase estimator:
performs a differential operation on each of the adjacent members of the plurality of pilot subcarrier signals,
sums signals generated by the differential operation, and
generates the linear phase estimate by measuring an angle of the sum of the signals and dividing the angle by a distance between the adjacent members of the plurality of pilot subcarrier signals; and
a channel estimator that estimates a channel response from the pilot subcarrier signals using the estimated linear phase.

12. The system of claim 11, wherein each of the adjacent members of the plurality of pilot subcarrier signals are regularly spaced.

13. The system of claim 12, wherein the linear phase estimator:
performs the differential operation by calculating $D_q[k]$ using $D_q[k]=Y^*[k]Y[k+q]$ for $k \epsilon \tilde{P}$, where q is a distance between the regularly spaced pilot subcarrier signals and $\tilde{P}$ is a set of the p regularly spaced pilot subcarrier signals excluding a highest frequency pilot subcarrier signal;
sums the signals generated by the differential operation by calculating $$D_{sum} = \sum_{k \in \tilde{P}} D_q[k];$$

and
generating the linear phase by calculating $$\theta = \frac{1}{q} \angle(D_{sum}).$$

14. The system of claim 11, wherein each of the adjacent members of the plurality of pilot subcarrier signals are spaced at different distances.

15. The system of claim 14, wherein the linear phase estimator:
performs the differential operation by calculating $D[k_i]$ using $D[k_i]=Y^*[k_i]Y[k_{i+1}]$ for $k_i \epsilon \tilde{P}$, where $D[k_i]$ is partitioned into a plurality of sets based on the different distances, $I_m$ is a set of indices such that the plurality of pilot subcarrier signals within each set $D[k_i]$ are separated by $q_m$, and M is a number of different intervals;
sums the signals generated by the differential operation by calculating $$D_{sum,m} = \sum_{i \in I_m} D[k_i];$$

and
generates the linear phase by calculating $$\theta_m = \frac{1}{q_m} \angle(D_{sum,m})$$

and calculating a final linear phase estimate θ from $\theta_m$.

16. The system of claim 11, further comprising:
a linear phase removal block that removes the estimated linear phase from the plurality of pilot subcarrier signals to generate a plurality of phase-removed pilot subcarrier signals;
a channel estimator that calculates an estimated channel response from the plurality of phase-removed pilot subcarrier signals; and
a linear phase restorer that generates a final estimated channel response by multiplying the estimated channel response by the estimated linear phase.

17. The system of claim 11, wherein channel response estimation is used in an orthogonal frequency division multiplexing (OFDM) protocol, a WiMax protocol, or a WiFi protocol.

18. The system of claim 11, further comprising at least one additional antenna and wherein each of the additional antennas receives its own signal and separately estimates a channel response.

19. The system of claim 11, wherein the final estimated channel response can be averaged over time with further final estimated channel responses.

20. The system of claim 11, wherein the channel estimator comprises a linear interpolator.

21. Non-transitory computer readable media for estimating a channel response, the non-transitory computer readable medium having instructions recorded thereon for:
receiving a signal that includes a plurality of pilot subcarrier signals;
estimating a linear phase between adjacent members of the plurality of pilot subcarrier signals, wherein estimating the linear phase comprises:

performing a differential operation on each of the adjacent members of the plurality of pilot subcarrier signals, summing signals generated by the differential operation, and generating the linear phase estimate by measuring an angle of the sum of the signals and dividing the angle by a distance between the adjacent members of the plurality of pilot subcarrier signals; and estimating a channel response from the pilot subcarrier signals using the estimated linear phase.

22. The non-transitory computer readable media of claim 21, wherein each of the adjacent members of the plurality of pilot subcarrier signals are regularly spaced.

23. The non-transitory computer readable media of claim 22, wherein:

performing the differential operation comprises calculating $D_q[k]$ using $D_q[k]=Y^*[k]Y[k+q]$ for $k \in \tilde{P}$, where q is a distance between the regularly spaced pilot subcarrier signals and $\tilde{P}$ is a set of the p regularly spaced pilot subcarrier signals excluding a highest frequency pilot subcarrier signal;

summing the signals generated by the differential operation comprises calculating $$D_{sum} = \sum_{k \in \tilde{P}} D_q[k];$$

generating the linear phase comprises calculating $$\theta = \frac{1}{q} \angle(D_{sum}).$$

24. The non-transitory computer readable media of claim 21, wherein each of the adjacent members of the plurality of pilot subcarrier signals are spaced at different distances.

25. The non-transitory computer readable media of claim 24, wherein:

performing the differential operation comprises calculating $D[k_i]$ using $D[k_i]=Y^*[k_i]Y[k_{i+1}]$ for $k_i \in \tilde{P}$, where $D[k_i]$ is partitioned into a plurality of sets based on the different distances, $I_m$ is a set of indices such that the plurality of pilot subcarrier signals within each set $D[k_i]$ are separated by $q_m$, and M is a number of different intervals;

summing the signals generated by the differential operation comprises calculating $$D_{sum,m} = \sum_{i \in I_m} D[k_i];$$

and generating the linear phase comprises calculating $$\theta_m = \frac{1}{q_m} \angle(D_{sum,m})$$

and calculating a final linear phase estimate θ from $\theta_m$.

26. The non-transitory computer readable media of claim 21, wherein estimating the channel response using the estimated linear phase comprises:

removing the estimated linear phase from the plurality of pilot subcarrier signals to generate a plurality of phase-removed pilot subcarrier signals;

calculating an estimated channel response from the plurality of phase-removed pilot subcarrier signals; and generating a final estimated channel response by multiplying the estimated channel response by the estimated linear phase.

27. The non-transitory computer readable media of claim 21, wherein the channel response estimation is used in an orthogonal frequency division multiplexing (OFDM) protocol, a WiMax protocol, or a WiFi protocol.

28. The non-transitory computer readable media of claim 21, wherein the signal is received by a first antenna in a multiple antenna system and wherein each antenna in the multiple antenna system receives its own signal and separately estimates a channel response.

29. The non-transitory computer readable media of claim 21, wherein the final estimated channel response can be averaged over time with further final estimated channel responses.

30. The non-transitory computer readable media of claim 21, wherein estimating the channel response comprises linear interpolation.

* * * * *